(No Model.)
H. P. COPE.
HOSE TRUCK.
No. 332,589. Patented Dec. 15, 1885.
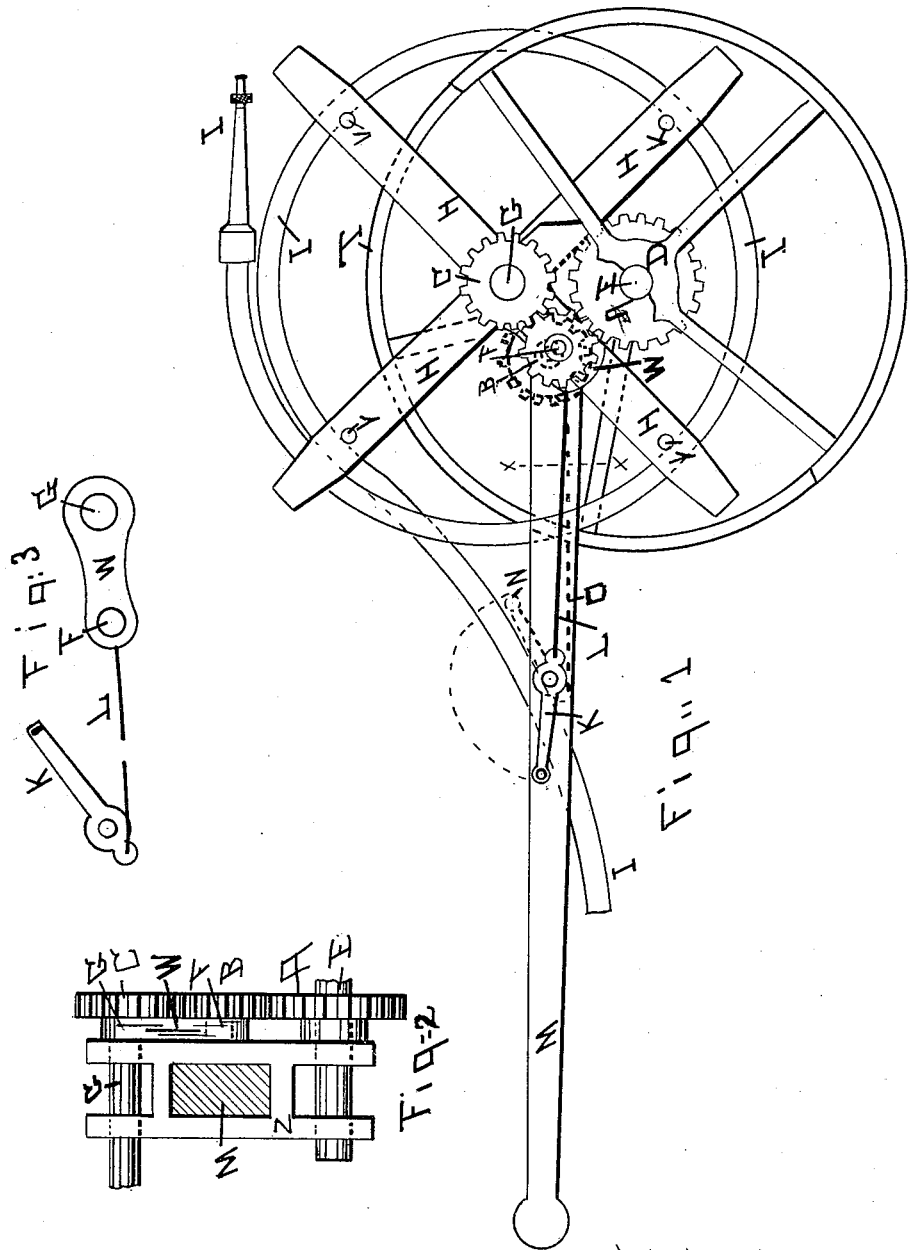

# UNITED STATES PATENT OFFICE.

HENRY P. COPE, OF DETROIT, MICHIGAN, ASSIGNOR OF ONE-HALF TO JOHN H. BISSELL, OF SAME PLACE.

HOSE-TRUCK.

SPECIFICATION forming part of Letters Patent No. 332,589, dated December 15, 1885.

Application filed July 18, 1885. Serial No. 172,019. (No model.)

*To all whom it may concern:*

Be it known that I, HENRY P. COPE, of Detroit, in the county of Wayne and State of Michigan, have invented a new and useful Improvement in Hose-Trucks, of which the following is a specification.

My invention consists in an improvement in hose-trucks in which the reel is detachably geared to the wheels of the truck, whereby the hose, when unwound, may be wound on the reels by rolling the reel along over the hose.

It will of course be understood that the shafts E for the wheels T are in the form of independent short spindles, which do not project sufficiently from the frame Z to interfere with the revolutions of the reel, hereinafter set forth.

Figure 1 is a side elevation; Fig. 2, a section on the line $x\ x$, Fig. 1, showing the gear and omitting the wheel and reel; and Fig. 3 is an enlarged side elevation of the gear and locking and unlocking mechanism.

T represents one of the wheels, of which there are two, and M represents one of two bars framed together properly, and on each of which, at the lower end, is fastened a frame, Z, in the lower part of which is journaled a short shaft, E, on which the hub D of the wheel T is fastened, so that said shaft E revolves with the wheel. Both wheels may be arranged in this way, or only one, for in trucks for ordinary garden-hose one wheel will give sufficient power to wind up the hose.

A represents a gear-wheel secured to shaft E between the hub of the wheel and the frame Z.

G represents a shaft journaled in the upper part of each frame Z, extending across the machine, and having secured thereto near each end, but within the bars M, four arms, H, each being connected with the corresponding arm at the other end of shaft G by a bar, V, thus forming a reel on which a hose can be wound. The shaft G, being above the shaft E when the truck is in position for wheeling, as shown in Fig. 1, permits the reel to be as large, or nearly so, as the wheel, and yet revolve without touching the ground when the truck is wheeled.

C represents a gear-wheel secured to shaft G directly over wheel A, but not in contact therewith.

W represents a link sleeved on shaft G, just within gear-wheel C, and carrying at its free end a short shaft, F, on which is loosely set a gear-wheel, B, and the length of link W, as shown in the drawings, and preferred by me, is such that wheel B will constantly mesh with wheel C, though of course said link may be made somewhat longer, if desired.

K represents a lever of the first order, pivoted to bar M, and having its short arm connected by a rod, L, with the free end of link W. By moving lever K until it stands in the position shown in dotted lines at N the connecting-rod L is moved into the position shown in dotted lines at O, and the gear-wheel B is moved by the swinging of the free end of the link into the position shown in dotted lines at W, in which it does not mesh with gear-wheel A and is not affected by the rotation of gear-wheel A. When lever K stands in the position shown in Fig. 1 in full lines, the gear-wheel B meshes both with gear-wheels A and C, and when gear-wheel A is rotated by the motion of wheel T it rotates gear-wheel C through the medium of gear-wheel B, and thus causes shaft G, and with it the reel, to revolve.

I represents a hose wound on the reel.

The operation of my invention is as follows: When the hose is wound on the reel, the truck can be wheeled from place to place by throwing gear-wheel B out of mesh with gear-wheel A, and the reel will not revolve. In this condition the hose can be unwound from the reel while the truck remains stationary. When it is desired to wind up the hose, wheel B is thrown into mesh with wheel A and the truck is simply wheeled along over the hose, when the gear causes the reel to rotate and wind up the hose. The gear-wheels A C may be made of the same or different diameters, so that the travel of the reel will be the same or faster than that of the wheel T; but this depends upon the proportion which the builder chooses to give to the wheel and reel, and is understood by all mechanics; and the locking and unlocking mechanism may be varied by substituting for that shown any of the well-known mechanical movements for similar purposes.

What I claim as my invention, and desire to secure by Letters Patent, is—

In combination with the wheel of a hose-truck, a gear-wheel secured to the axle of the wheel, a hose-reel having a gear-wheel secured to its shaft, and a movable gear-wheel adapted to connect said gear-wheels together, substantially as shown and described.

HENRY P. COPE.

Witnesses:
CHARLES B. LOTHROP,
GEO. H. LOTHROP.